Oct. 15, 1968  C. H. BROWN  3,405,781

VEHICLE LIFTING APPARATUS

Filed April 5, 1967

INVENTOR.
CHARLES H. BROWN
BY
Dybvig & Dybvig
HIS ATTORNEYS

United States Patent Office 3,405,781
Patented Oct. 15, 1968

3,405,781
VEHICLE LIFTING APPARATUS
Charles H. Brown, Dayton, Ohio, assignor, by direct and mesne assignments, to The Joyce-Cridland Company, Dayton, Ohio
Filed Apr. 5, 1967, Ser. No. 628,653
8 Claims. (Cl. 187—8.41)

ABSTRACT OF THE DISCLOSURE

At least one lifting carriage of a pair of vehicle jacks has slides mounted on rollers between a pair of stops on each of a pair of support rails. Therefore, the slides can move on the rails when engaged with a vehicle should the vertical travel of the two carriages be unequal. Freedom of each slide to move toward either of its associated stops after the slides are engaged with a vehicle is assured by springs which center each slide between its stops under no-load conditions. Vehicle engaging pads on the slides are designed to receive various types of sliding and rotating adapters.

---

This invention relates to a vehicle lifting apparatus and more particularly to a vehicle engaging assembly for vehicle jacks. However, as will become apparent, the invention is not necessarily so limited.

This invention is illustrated in connection with a lift installation of the type disclosed in U.S. Patent No. 3,271,006 granted to C. H. Brown et al. on Sept. 6, 1966, and in connection with high rise jacks of the type shown in U.S. Patent No. 3,215,402 which was granted to Ion V. K. Hott et al. on Nov. 2, 1965. As indicated by these two patents, efforts are being made today to provide above ground lift installations which can safely be used to lift automobiles and other motor vehicles to a height of approximately 60 inches so that work can conveniently be performed on the underside of the vehicles. The apparatus described in the aforementioned patents provides for a pair of portable jacks which, when engaged with a vehicle, are adequately stable and can be synchronized to work together to safely lift vehicles.

To achieve adequate stability, it is desirable, if not necessary, that the portable jacks remain in a fixed position. In installations of this type, the problem exists that the lifting carriages of the two jacks may not always be operated synchronously and that one end of the vehicle may be raised or lowered at a faster rate than the other end. In this event, the separation between the lifting carriages will vary between a minimum separation, in which corresponding points on the two carriages lie in a common horizontal plane, and larger separations, in which the same corresponding points on the two carriages are vertically offset. Of course, there is a certain amount of flexibility in the jacks which can accommodate small variances in the vertical displacements of the two jack carriages. It will be appreciated, however, that a large variance could severely strain the jacks and could even result in the dropping of a vehicle. In any event, the possible unequal movement of the lifting carriages constitutes a serious safety hazard for anyone in the area of two portable jacks lifting a vehicle.

An object of this invention is to overcome the aforementioned safety hazard. To accommodate the change in separation between the two carriages should they get out of synchronism, one of the lifting carriages is provided with relatively movable portions. As will become apparent, an entirely new design for load engaging and lifting carriages is provided by this invention.

Other objects of this invention reside in the provision of a load engaging member for vehicle lifting apparatus which slides on a rail under load conditions in the event there is a relative shift between the load and the rail and in the provision of apparatus for positioning the slide on the rail under no-load conditions. Two rails are preferably provided for each lifting carriage. Accordingly, the provision of a positioning device for the slides insures that the slides are aligned side-by-side in a position wherein they can safely move along the rails when engaged with the desired lifting points of a vehicle.

Other objects and advantages will become apparent from the following description.

Referring to the drawing, FIGURE 1 is a perspective view of a vehicle lifting installation employing two jacks operatively elevating a vehicle. Portions of the vehicle are broken away to reveal additional parts of a jack made in accordance with this invention.

Figure 2:
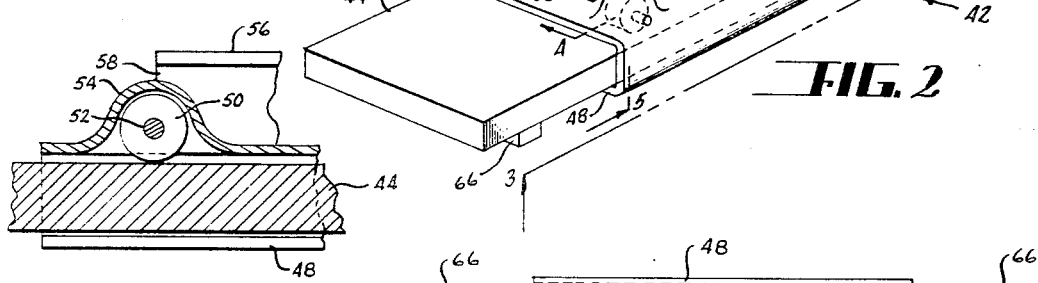
FIGURE 2 is a perspective view of a portion of a vehicle engaging assembly made in accordance with this invention provided with an adapter.
Figure 4:
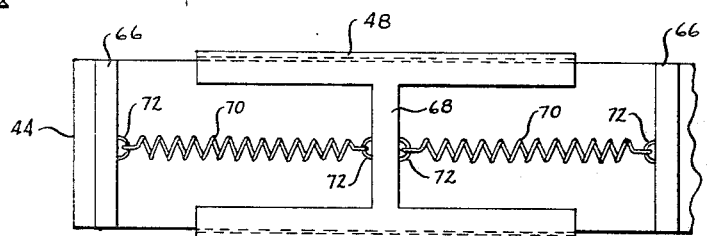
Figures 3, 5, 6:
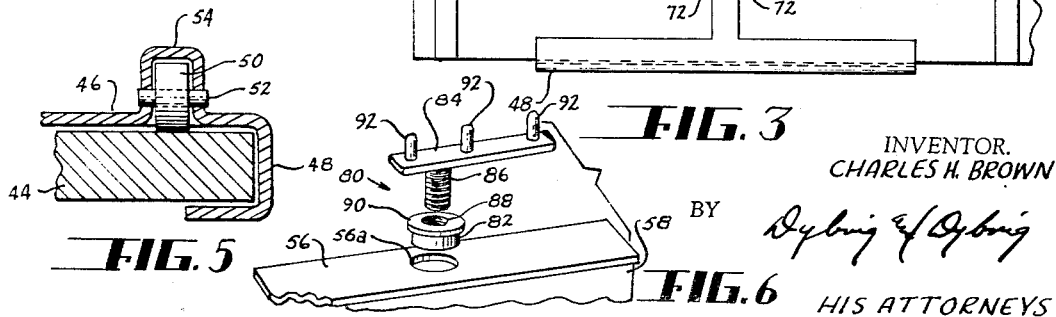
FIGURE 3 is a plan view, as viewed in the direction of arrows 3—3 of FIGURE 2, of the underside of the vehicle engaging assembly.

FIGURES 4 and 5 are partial cross sectional views taken on lines 4—4 and 5—5, respectively, of FIGURE 2.

FIGURE 6 is an exploded view of a portion of the vehicle engaging assembly and a rotating adapter for use therewith.

Figure 1:
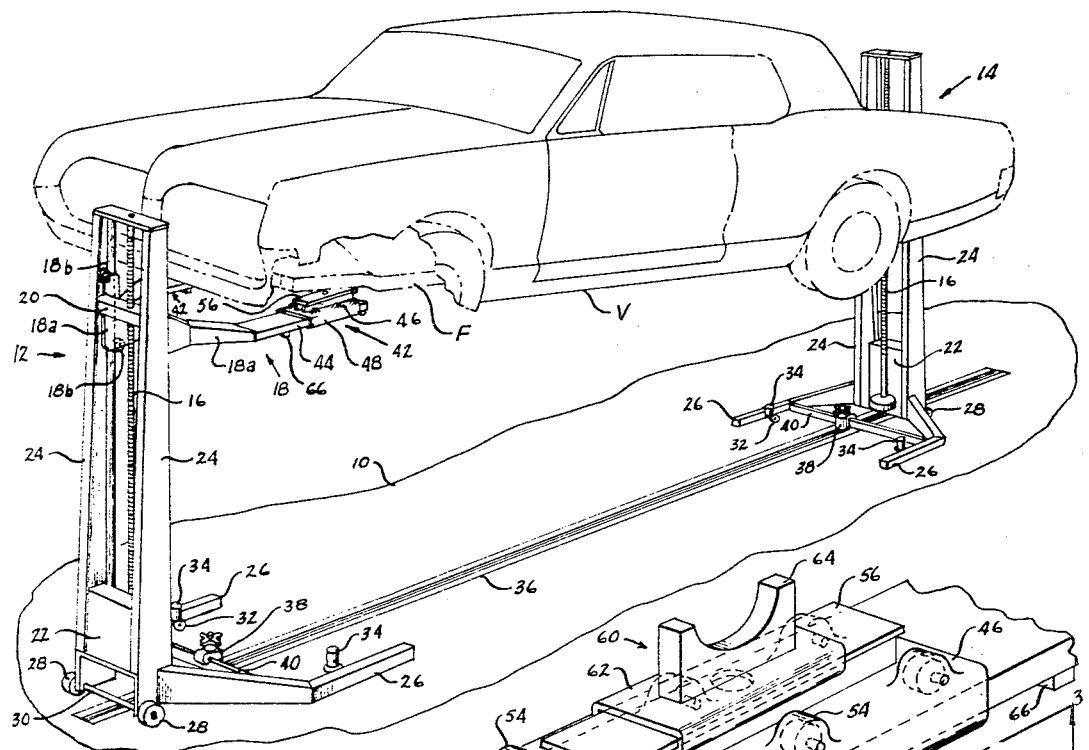

Referring to FIGURE 1, this invention is illustrated in connection with a vehicle lift installation applied to a vehicle V elevated above a floor 10 by a portable front jack 12 and a portable rear jack 14. The jacks 12 and 14 illustrated are of the type described in the aforementioned Hott et al. Patent No. 3,215,402 and each includes an elongate screw shaft 16 driving a load engaging and lifting carriage 18 through a ball screw device (not shown) enclosed within a carriage beam 20 forming part of the carriage 18. Only the carriage 18 of the front jack 12 is visible in FIGURE 1. As will become apparent, the corresponding carriage of the rear jack 14 may be of the same or of a different construction. The carriage 18 of the front jack 12 further includes a pair of side arms 18A supporting a pair of rollers 18B engaging trackways formed on the stanchions 24. Only one pair of the rollers 18B can be seen in FIGURE 1, the other pair being hidden by the stanchion 24 on the right in FIGURE 1. The side arms 18A are affixed to the opposite sides of the carriage beam 20 so that, as apparent, upon rotation of the screw shaft 16 the carriage 18 will raise or lower. The screw shaft 16 may be driven by an electric motor (not shown) mounted in a motor housing 22 located between a pair of spaced stanchions 24 forming a portion of the frame of each of the jacks 12 and 14.

The base of each of the jacks 12 and 14 comprises a pair of divergent legs 26 attached to the lower portions of the stanchions 24 and spanning a sufficient area to stabilize each jack. Each jack 12 and 14 is portable and for this purpose may be provided with a pair of rear wheels 28 mounted for rotation on an axle 30 received in aligned apertures adjacent the base of the stanchions 24. Under no-load conditions, the jacks 12 and 14 are also supported by a pair of spring biased forward wheels or casters 32 mounted on forwardly extending portions of the legs 26. Springs (not shown) located in spring housings 34 attached to the legs 26 are overcome as the jacks 12 and 14 engage a vehicle and permit the legs 26 to come into flush engagement with the floor 10. To further stabilize the jacks 12 and 14, a slotted track 36 may be embedded in the floor 10 for receiving clamping or locking members 38 mounted on clamp support plates 40 connected between the legs 26 of each jack 12 and 14. This type of structure for releasably clamping the jacks 12 and 14 to the floor 10 is more fully described in the aforementioned Brown et al. Patent No. 3,271,006. As thus far described, the lift installation of FIGURE 1 may be entirely conventional. For purposes of this invention, the provision of the trackway 36 is unimportant as is the particular type of carriage drive and other details which are, for the most part, only schematically illustrated in FIGURE 1.

In accordance with this invention, which is illustrated in connection with the front jack 12 in FIGURE 1, the carriage side arms 18A terminate in forwardly extending vehicle engaging assemblies generally designated 42, each including a forwardly and horizontally extending rail 44. The two rails 44 are parallel. Both vehicle engaging assemblies 42 of the jack 12 are identical, hence, only one is fully illustrated in FIGURE 1 and only one will be described herein. With reference also to FIGURE 2, the vehicle engaging assembly 42 includes, in addition to the rail 44, a slide 46 mounted on the rail 44 having side channels 48 along its longer edges receiving the longitudinal edges of the rail 44. The slide 46 is supported on the rail 44 by a plurality of rollers 50 (see also FIGURES 4 and 5) mounted for rotation on stub shafts 52 which in turn are mounted in aligned apertures in roller housings 54 formed upwardly from the top surface of the slide 46. The stub shafts 52 may be welded to the roller housings 54. The rollers 50 constitute anti-friction means which permit the slide 46 to move along the rail 44 even when the load engaging assembly 42 is supporting a vehicle.

The vehicle V of FIGURE 1 is illustrated as having a frame extension F contacted by a pad comprising a rectangular pad top plate 56 and a pair of pad support plates or spacers 58. The spacers 58 are mounted on the top face of the slide 46 and support the pad top plate 56 such that its top face lies in a horizontal plane which is higher than the top surfaces of the roller housings 54. The length of each support plate or spacer 58 is coextensive with the length of the rectangular pad top plate 56. Accordingly, the elements 56 and 58 form a rigid pad mounted on the slide 46 adapted to safely engage portions of the underbody of vehicles such as the frame extension F. The support plates or spacers 58 are spaced inwardly from the longitudinal side edges of the rectangular pad top plate 56 whereby both the top and bottom surfaces of the opposed longitudinal edges of the top plate 56 are exposed along their lengths and specialized load contact members may be mounted thereon. As an illustration, an adapter 60 is shown in FIGURE 2 comprising a slide 62 having side channels receiving the exposed side edges of the top plate 56 and having a notched plate 64 supported centrally of the slide 62. The adapter 60 is especially adapted to engage the rear axle of an automobile and, of course, would be used on jacks which are intended to engage vehicles from the rear thereof, that is, jacks positioned in the place of the jack 14 of FIGURE 1.

As another illustration, a rotating adapter generally designated 80 is illustrated in FIGURE 6. The adapter 80 comprises a bushing 82 which may be received within an aperture 56a centrally located in the pad top plate 56 and further comprises an adapter arm 84 having a depending screw threaded stud 86 threadedly received within a central opening 88 longitudinally extending through the bushing 82. When assembled, an annular flange 90 on the bushing 82 rests upon the ring-shaped portion of the pad top plate 56 surrounding the aperture 56a. The threaded stud 86 can be screwed part or all the way into the opening 88 depending upon the desired separation between the pad top plate 56 and the adapter arm 84. To enable rotation of the entire adapter 80 without a change in the separation between the adapter arm 84 and the pad top plate 56, the bushing 82 is loosely received within the aperture 56a. Lugs 92 projecting upwardly from the top surface of the adapter arm 84 assist in engaging selected pick-up or load contact points of a vehicle. For example, adjacent lugs 92 may straddle a vehicle frame member or frame extension.

The primary advantage of the adapter 80 shown in FIGURE 6 resides in the extended reach of the adapter arm 84. The threaded stud 86 is spaced or offset from a vertical line extending centrally through the horizontal extension of the adapter arm 84 and the adapter arm 84 is sufficiently long to extend beyond the longitudinal side edges of the rail 44 upon which it is mounted. Accordingly, the adapter arm 84 may be swung outward of the rails 44 upon which adapters 80 are mounted. Thus, even though the rails 44 are at a fixed separation, contact or pick-up points on the underside of vehicles separated by spacings different from the spacing of the rails 44 can be engaged by the adapter arms 84.

In FIGURE 1 the vehicle V is shown tilted with respect to the floor 10 because the carriage 18 of the front jack 12 is higher than the corresponding carriage of the rear jack 14. Accordingly, the separation between corresponding points on the two jack carriages is greater than the separation between the same points would be if the carriages were raised to the same height. This presents no program because of the roller mounting of the slides 46 on the rails 44 of the front jack 12. It may be noted that the rear jack 14 need not be provided with sliding pads because in all but extreme circumstances the slides 46 would never be required to travel more than a few inches on the rails 44. In most cases, the movement of the slides 46 to accommodate the separation between the carriages of the two jacks 12 and 14 would be toward the forward or free ends of the rails 44. The only exceptions would be in case the rear jack 14 raised the rear end of the vehicle V before the carriage 18 of the front jack 12 became engaged with the front end of the vehicle V, or in the case of lowering the vehicle V from a tilted position in which the rear of the vehicle was initially higher than the front end of the vehicle.

In order to better accommodate movement of the slides 46 in both directions along their rails 44, and for purposes of safety, the rails 44 are provided with stops in the form of spaced, transverse bars 66 intermediate the ends of the rails 44 and depending from the undersides thereof. As apparent from an inspection of FIGURES 2 and 3, the bars 66 prevent accidental removal of the slides 46 from the rails 44 and prevent any extreme movements of the slides 46 in either direction along the rails 44. As also shown in FIGURE 3, each slide 46 includes a rib 68 transversely extending midway of the length thereof underneath its associated rail 44 and between the opposed lower edges of its channels 48.

A pair of substantially identical coil springs 70 are mounted at each end of eye fixtures 72 in confronting surfaces of the stop bars 66 and the rib 68. The springs 70 are mutually opposing and will, therefore, center the slide 46 between the two stop bars 66 when there is no load supported by the carriage 18. Such prepositioning of the slides 46 on the rails 44 between the stop bars 66 insures that the slides 46 can move in both directions on the rails 44 when engaged with a load. Also, this arrangement of the stop bars 66, the ribs 68 and the springs 70 insures that the two slides 46 of the front jack 12 are appropriately aligned in side-by-side relation when engaging the lifting points of a vehicle as recommended by the vehicle manufacturer. Of course, the springs 70 are made sufficiently weak that they have no substantial effect on the position of the slides 46 when engaged with a load.

Although the presently preferred embodiment of the device has been described, it will be understood that within the purview of this invention various changes may be made within the scope of the appended claims.

Having thus described my invention, I claim:

1. A vehicle lifting apparatus of the type including a rail, a slide mounted on said rail for movement longitudinally thereof, and load engaging means on said slide, wherein the improvement comprises bias means engaging between said slide and said rail maintaining said slide at a predetermined position on said rail under no-load conditions and said load engaging means includes an arm mounted for rotation on said slide about a vertical axis spaced from a vertical line extending centrally through the horizontal extension of said arm, said arm being sufficiently long to project beyond the longitudinal side edges of said rail.

2. A vehicle lifting apparatus of the type including a rail, a slide mounted on said rail for movement longitudinally thereof, and load engaging means on said slide, wherein the improvement comprises bias means engaging between said slide and said rail maintaining said slide at a predetermined position on said rail under no-load conditions and said load engaging means comprises a pad having a top plate, spacer means supporting said top plate on said slide and a rotatable adapter including an adapter arm mounted for rotation on said top plate about a vertical axis offset from the center of the horizontal extension of said adapter arm.

3. A vehicle lifting apparatus of the type including a rail, a slide mounted on said rail for movement longitudinally thereof, and load engaging means on said slide, wherein the improvement comprises bias means engaging between said slide and said rail maintaining said slide at a predetermined position on said rail under no-load conditions and said load engaging means comprises a pad having a top plate and spacer means supporting said top plate on said slide, both the top and the bottom surfaces of opposed edges of said top plate being exposed along their lengths whereby a specialized load contact member having a base with channels extending along opposite sides thereof may be removably mounted on said pad with said channels receiving said opposed edges.

4. A vehicle lifting apparatus of the type including a rail, a slide mounted on said rail for movement longitudinally thereof, and load engaging means on said slide, wherein the improvement comprises a rib connected to and transversely extending midway of the length of said slide underneath said rail, a pair of bars connected to and transversely extending along the under side of said rail, side slide being movable between said bars, and a pair of substantially identical springs connected to said rib and centering said slide between said bars under no-load conditions, one of said springs being also connected to one of said bars and the other of said springs being also connected to the other of said bars.

5. A vehicle lifting apparatus of the type including a rail, a slide mounted on said rail for movement longitudinally thereof, and load engaging means on said slide wherein the improvement comprises a pair of stops connected to said rail, said slide being movable between said stops, a pair of substantially identical springs connected to said slide and centering said slide between said stops under no-load conditions, one of said springs being also connected to one of said stops and the other of said springs being also connected to the other of said stops, said slide being mounted by anti-friction means on said rail permitting movement of said slide while said load engaging means is engaged with a load to accommodate shifts in the load, said springs being sufficiently weak not to interfere substantially with the movement of said slide under load, and said load engaging means includes an arm mounted for rotation on said slide about a vertical axis spaced from a vertical line extending centrally through the horizontal extension of said arm, said arm being sufficiently long to project beyond the longitudinal side edges of said rail.

6. In a portable jack of the type having a load supporting carriage mounted for vertical movement upon a frame and a pair of load engaging assemblies connected to said carriage, the improvement wherein each of said load engaging assemblies comprises a rail, a slide mounted for longitudinal movement on said rail by anti-friction means permitting sliding movement of said slide under load, bias means attached to said slide and prepositioning said slide on said rail under no-load conditions, and load engaging means on said slide including an arm mounted for rotation on said slide about a vertical axis spaced from a vertical line extending centrally through the horizontal extension of said arm, said arm being sufficiently long to project beyond the longitudinal side edges of said rail.

7. In a portable jack of the type having a load supporting carriage mounted for vertical movement upon a frame and a pair of load engaging assemblies connected to said carriage, the improvement wherein each of said load engaging assemblies comprises a rail, a slide mounted for longitudinal movement on said rail by anti-friction means permitting sliding movement of said slide under load, bias means attached to said slide and prepositioning said slide on said rail under no-load conditions, and load engaging means on said slide comprising a pad having a top plate, spacer means supporting said top plate on said slide, and a rotatable adapter including an adapter arm mounted for rotation on said top plate about a vertical axis offset from the center of the horizontal extension of said adapter arm.

8. In a portable jack of the type having a load supporting carriage mounted for vertical movement upon a frame and a pair of load engaging assemblies connected to said carriage, the improvement wherein each of said load engaging assemblies comprises a rail, a slide mounted for longitudinal movement on said rail by anti-friction means permitting sliding movement of said slide under load, bias means attached to said slide and prepositioning said slide on said rail under no-load conditions, and load engaging means on said slide comprising a pad having a top plate and spacer means supporting said top plate on said slide, both the top and the bottom surfaces of opposed edges of said top plate being exposed along their lengths whereby a specialized load contact member having a base with channels extending along opposite sides thereof may be removably mounted on said pad with said channels receiving said opposed edges.

References Cited

UNITED STATES PATENTS 2,792,913   5/1957   Capgras _____ 187—8.41

EDWARD A. SROKA, *Primary Examiner.*

H. C. HORNSBY, *Assistant Examiner.*